United States Patent [19]

Ferguson et al.

[11] Patent Number: 5,366,942

[45] Date of Patent: Nov. 22, 1994

[54] CERAMIC FIBER PRODUCT AND STRUCTURE FOR HIGH TEMPERATURE SEVERE APPLICATION ENVIRONMENTS AND METHOD OF MAKING SAME

[75] Inventors: Alan Ferguson, Kingwood, Tex.; Perry B. Lassiter, Johnson City, Tenn.

[73] Assignee: American Premier, Inc., Pa.

[21] Appl. No.: 867,770

[22] Filed: Apr. 13, 1992

[51] Int. Cl.⁵ .............................................. C04B 35/58
[52] U.S. Cl. ..................................................... 501/95
[58] Field of Search ........................... 501/95; 106/624

[56] References Cited

U.S. PATENT DOCUMENTS

| | | | |
|---|---|---|---|
| 1,870,094 | 10/1930 | Carlin | 427/369 |
| 2,681,870 | 6/1954 | Novak | 117/65 |
| 2,683,305 | 7/1954 | Goetzel | 29/198 |
| 3,045,316 | 7/1962 | Gilhart | 28/72.3 |
| 3,112,219 | 11/1963 | Politzer et al. | 117/98 |
| 3,509,020 | 4/1970 | Gelsomino | 162/124 |
| 4,040,847 | 8/1977 | Miller | 106/69 |
| 4,208,230 | 6/1980 | Magarian | 156/184 |
| 4,369,203 | 1/1983 | Hansen | 427/10 |
| 4,698,319 | 10/1987 | Ray | 501/89 |
| 4,961,989 | 10/1990 | Grimwood | 428/229 |
| 5,021,369 | 6/1991 | Ackerman et al. | 501/95 |

Primary Examiner—Karl Group
Assistant Examiner—A. Wright
Attorney, Agent, or Firm—Ostrolenk, Faber, Gerb & Soffen

[57] ABSTRACT

A ceramic fiber product and method for manufacturing a ceramic fiber product for severe refractory environments. The method includes the steps of saturating a dry ceramic fiber material having an initial thickness with water or a nonbinding aqueous solution and squeezing the wetted ceramic fiber material to a latent compressed state having a thickness less than the initial dry thickness and removing liquid from the ceramic fiber material during the compressing step. The ceramic fiber is made of a material that springs back towards its initial dry thickness after drying. A monolithic ceramic fiber structure made from the ceramic fiber product is also described, as well as a kit for making a ceramic fiber structure and fasteners for attaching the product to a support form of the structure.

16 Claims, 5 Drawing Sheets

CERAMIC FIBER PRODUCT AND STRUCTURE FOR HIGH TEMPERATURE SEVERE APPLICATION ENVIRONMENTS AND METHOD OF MAKING SAME

BACKGROUND OF THE INVENTION

The present invention relates to a ceramic fiber product and system for high temperature, severe application environmental conditions, for example, a refractory, and which provides enhanced fiber properties and airborne fiber free installations. More particularly, the invention relates to a refractory insulation product and method for making the same that allows ceramic fiber to be used in higher temperature, more severe application environments than present standard ceramic fiber materials. The invention also relates to a structure using the ceramic fiber product, for example, a monolithic refractory lined structure for steel or ceramic foundries or other high temperature applications.

Virgin ceramic fiber is an excellent insulating material but has some drawbacks. For example, it has the tendency to shrink at elevated temperatures and in impurity laden environments, which limits its use in high temperature, severe application environments. Furthermore, there are limitations on the level of alumina or other refractory oxides or chemical compositions which can be achieved in conventional melt extracted ceramic fiber systems.

Densification and compression of ceramic fiber materials have been used in the past to improve performance of ceramic fibers at elevated temperatures. A disadvantage of these techniques has been that in order to achieve the higher densities and compressions required, the ceramic fiber blanket has to be subjected to forces supplied by mechanical or hydraulic jacks or presses, which are costly, require considerable amounts of time to operate and may be dangerous to person and property. In many cases, the higher densities and compressions are not enough to overcome the environmental conditions, and other methods including surface treatments of the ceramic fibers with ceramic coatings, after fabrication, into a structure, have been used with only limited success.

Applicants are aware of the following patents relating to the field of the invention:

| U.S. Pat. No. | Inventor |
| --- | --- |
| 1,870,094 | Carlin |
| 2,681,870 | Novak |
| 2,683,305 | Goetzel |
| 3,045,316 | Gilbert |
| 3,112,219 | Politzer et al. |
| 3,509,020 | Gelsomino |
| 4,040,847 | Müller |
| 4,208,230 | Magarian |
| 4,369,203 | Hansen |
| 4,698,319 | Ray |
| 4,961,989 | Grimwood |
| 5,021,369 | Ackerman et al. |

U.S. Pat. No. 1,870,094 relates to a process of rendering a slag wool or mineral wool dustless, thereby reducing the danger of injury to workmen. The process comprises saturating the wool material with a solution, then removing the excess solution and drying the wool material. The solutions taught therein are other than water, for example, deliquescent salt or calcium chloride.

U.S. Pat. No. 3,045,316 relates to the formation of pads or blanks of mineral wool and to a method and apparatus for imparting predetermined surface configurations to the pads or blankets to facilitate application of the pads or blankets to surfaces to be protected thereby.

U.S. Pat. No. 3,509,020 relates to a method of bonding a plurality of laminated fibrous plies into an integral fiber sheet which is resistant to delamination during handling and/or use. The method incorporates interlocking the plies by applying an aqueous solution of a water soluble thickening agent to the surfaces of the individual fibrous plies and then pressing them together.

U.S. Pat. No. 4,040,847 relates to a refractory fiber thermal insulation composition suitable for use in water containing packages known as "wet packs". The reference teaches impregnating a refractory fiber blanket with a binder system comprising three basic components: an aqueous suspension of colloidal silica of critical particle size, ethylene glycol and water. The binder system is formed by mixing together the aqueous suspension of colloidal silica, ethylene glycol and added water. The mixture may be placed in a large vessel or tank into which the refractory fiber blanket is dipped. Alternatively, the patent states that the binder system may be pumped from a reservoir tank and sprayed onto the blanket. The impregnated blanket may then immediately be packaged in air and water-tight containers, preferably plastic bags. It is recommended that the blanket be first compressed by passing it through compression rolls to squeeze out the excess binder and accurately set the thickness of the blanket prior to packaging in the air and water-tight containers.

U.S. Pat. No. 4,208,230 relates to an apparatus and method for impregnating a fibrous web with liquid resin. A moving, fibrous web is impregnated with the resin by applying the resin on the surface of the web, spreading the resin over the web surface, pressurizing a portion of the resin into the web to partially saturate the web with the resin and leave residual resin on the web, and metering the residual resin into a layer of substantially uniform thickness. This layer is then forced into the web to saturate it with the resin. The patent discloses that the method is particularly effective for producing plastic pipe incorporating at least one layer of fibrous material saturated with liquid resin.

U.S. Pat. No. 4,369,203 relates to a process for the impregnation of asbestos or other fibrous materials, comprising, as a first step, impregnating, with 10 the application of pressure, the material with a polymeric resin binder to saturate substantially the material with the binder and, as a second binder gel step, applying a polymeric resin compound comprising a polymeric resin and a filler. This process was designed to prevent the escape of minute fibers of asbestos into the atmosphere to reduce the health hazard associated with asbestos. A roller can be used to compress the asbestos material to cause movement of the liquid to penetrate entirely through the material.

U.S. Pat. No. 4,961,989 relates to a flame-resisting material consisting of layers of ceramic fibers imbedded with a silicone rubber compound. A ceramic fiber cloth is cut into a predetermined size and laid horizontally on a polished lower platen. A silicone rubber compound is then applied to the upper face of the cloth. The cloth is then turned over and the upper side is rolled with a roller to squeeze the silicone rubber compound through the interstices of the cloth weave.

U.S. Pat. No. 5,021,369 relates to a process of gelling a sol in fiber-formed ceramic insulation. The patent details a process in which a felted mat of ceramic fibers is impregnated with a sol-gel glass binder and is exposed to a low voltage direct current to catalytically gel the binder at ambient temperature and ambient pressure without Ph conversion catalysts. The gelled binder can be converted to a ceramic thereafter and is stabilized by firing above 525° F.

Nothing in the prior art, of which applicants are aware, teaches or suggests a method for impregnating a ceramic fiber blanket with water or a nonbinding aqueous solution and compressing the blanket with a roller or other compressing means, which results in the manufacture of a highly dense and highly compressed ceramic fiber blanket which can be used in higher temperature, more severe application environments than present standard ceramic fiber systems.

SUMMARY OF THE INVENTION

It is therefore an object of the present invention to provide a ceramic fiber product which is useful as a refractory material in high temperature, severe application environments.

It is yet still a further object of the present invention to provide such a ceramic fiber product which is useful at higher temperatures and in more severe application environments than present standard ceramic fiber materials or systems.

It is yet still another object of the present invention to provide a method for making the ceramic fiber product for high temperature, severe application environments.

It is yet still a further object of the present invention to provide a method for making such ceramic fiber products which can be used in higher temperature, more severe application environments than conventional ceramic fiber materials.

It is yet still another object of the present invention to provide a method for making a ceramic fiber product which is simple to practice and which does not require the costly, time consuming and dangerous high compression techniques utilized in prior art methods for making ceramic fiber materials or systems.

It is yet still a further object of the present invention to provide such a ceramic fiber product which uses aqueous nonbinding solutions to impregnate the ceramic 10 fibers and an inexpensive latent compression step to achieve high densities coupled with high compression.

It is yet still another object to provide a ceramic fiber product for use as a refractory material..

It is still a further object to provide a structure having a refractory lining using the ceramic fiber according to the invention as well as a method for making same.

The above and other objects of the present invention are achieved by a method for making a ceramic fiber product comprising the steps of saturating a dry ceramic fiber material having an initial thickness with water or a nonbinding aqueous solution and squeezing or compressing the wetted ceramic fiber material to a latent compressed state having a thickness less than the initial thickness and removing liquid from the ceramic fiber material during the squeezing step.

The objects of the invention are also achieved by a ceramic fiber product for a refractory environment comprising a ceramic fiber material having an initial dry thickness and saturated with water or a nonbinding aqueous solution and squeezed after saturating to a latent compressed state having a thickness less than the initial thickness, but still remaining wet, thereby facilitating the application of the compressed ceramic fiber product as a refractory lining to a support structure.

The objects of the invention are furthermore achieved by a ceramic fiber product made by the process comprising the steps of saturating a dry ceramic fiber material having an initial thickness with water or a nonbinding aqueous solution and squeezing the wetted ceramic fiber material to a latent compressed state having a thickness less than the initial thickness and removing liquid from the ceramic fiber material during the squeezing step.

The objects of the invention are also achieved by a structure having a ceramic fiber lining for a refractory environment, the structure comprising a support form, a ceramic fiber material having an initial dry thickness saturated with water or a nonbinding aqueous solution and squeezed after saturating to a latent compressed state having a thickness less than the initial thickness but still remaining wet, the ceramic fiber material comprising the refractory lining on the support form.

The objects of the invention are also achieved by a method for making a structure having a ceramic fiber lining for a refractory environment, the method comprising the steps of saturating a dry ceramic fiber material having an initial thickness with water or a nonbinding aqueous solution, squeezing the wetted ceramic fiber material to a latent compressed state having a thickness less than the initial thickness and removing liquid from the ceramic fiber material during the squeezing step and applying the wet, compressed ceramic fiber material to a support form.

Other objects, features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The invention provides a novel approach for using ceramic fiber at high temperatures and in severe application environments. Instead of applying dry ceramic fiber blankets directly as a refractory material for use in the high temperature environment, the blanket is first saturated with an aqueous solution, then subjected to a compression step before application in the environment. This provides an easy and inexpensive way to achieve high densities coupled with high compression. Additionally, the invention provides a way to enhance the physical and chemical properties of the ceramic fiber blanket. Blankets can be prewetted in the factory or can be provided dry for wetting in the field. Further, the type and level of chemical enhancement is unlimited.

Figure 1:
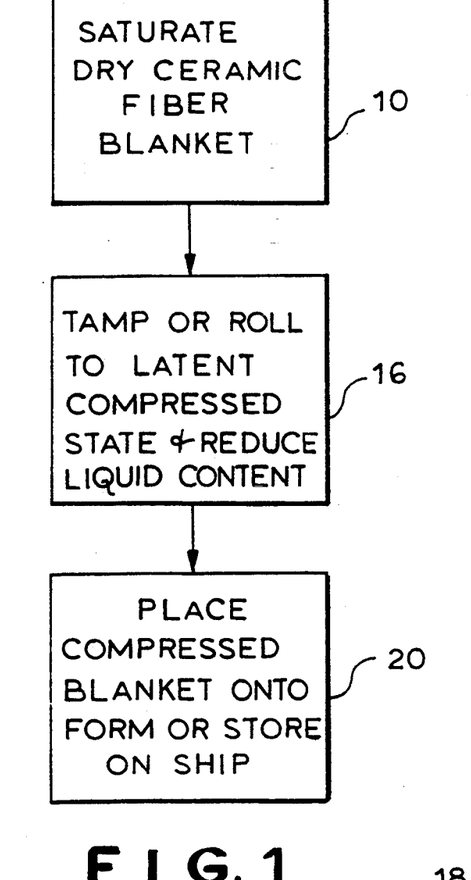
FIG. 1 shows the basic steps of the process according to the invention for making the ceramic fiber product according to the invention.

With reference now to FIG. 1, the basic steps of producing the ceramic fiber refractory system according to the invention are shown. Dry ceramic fiber blankets, for example, Cer-Wool spun fiber, available from Premier Refractories and Chemicals, Inc., King of Prussia, Pa., are suitably wetted with water or an aqueous solution into which chemicals providing desired properties may be dissolved or dispersed. This is shown at 10 in FIG. 1. The dry ceramic fiber blanket 11 may be provided from a supply roll as shown at 12 in FIG. 2, or may be suitably supplied in strips cut from larger sheets of the fiber blanket. The fiber blanket 11 is then suitably wetted by dipping it into a vat of the water or the aqueous solution, as shown at 14 in FIG. 2, or water or the aqueous solution may be sprayed or showered onto the fiber blankets.

Figure 2:
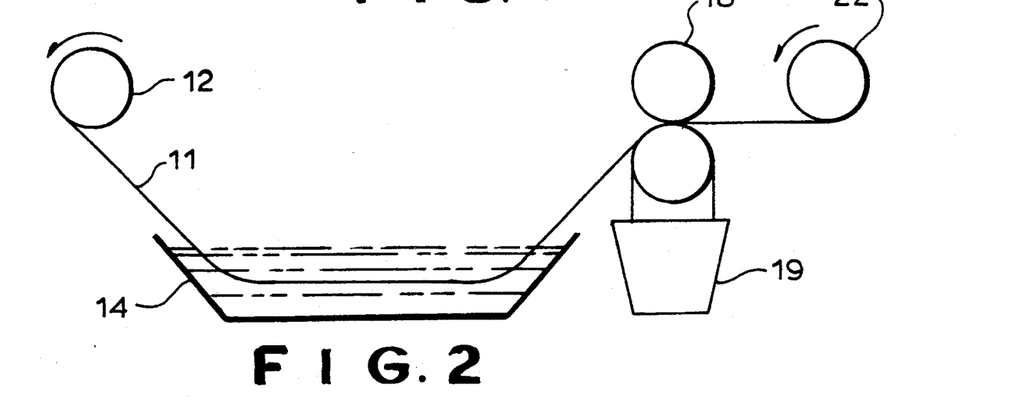
FIG. 2 shows one embodiment of a method for making the ceramic fiber product according to the invention.

Once the fiber blanket 11 has been wetted, it is then tamped or squeezed to reduce the moisture content of the fiber blanket and to compress it to a reduced thickness. This is shown in FIG. 1 at 16 and in FIG. 2, by the exemplary compression rolls 18. A container or other means 19 is provided for receiving the runoff water. Other means can be used to provide the compression step, for example, a flat iron bar can be moved manually or by machine over the wet ceramic fiber blanket to deliquefy and compress same. The deliquefied but still wet blanket can then be used directly, or it can be packaged in a substantially air and water tight package, e.g., a plastic package, for storage and subsequent use. Alternatively, as shown in FIG. 2, the wetted but deliquefied and compressed ceramic fiber material can be stored on a storage reel 22, suitably sealed in an air- and watertight way for later storage and subsequent use. The invention is also applicable in the field, instead of the factory, so that dry ceramic fiber material may be wetted in the field and thereafter compressed before application in the environment of use.

Figures 3A, 3B, 4:
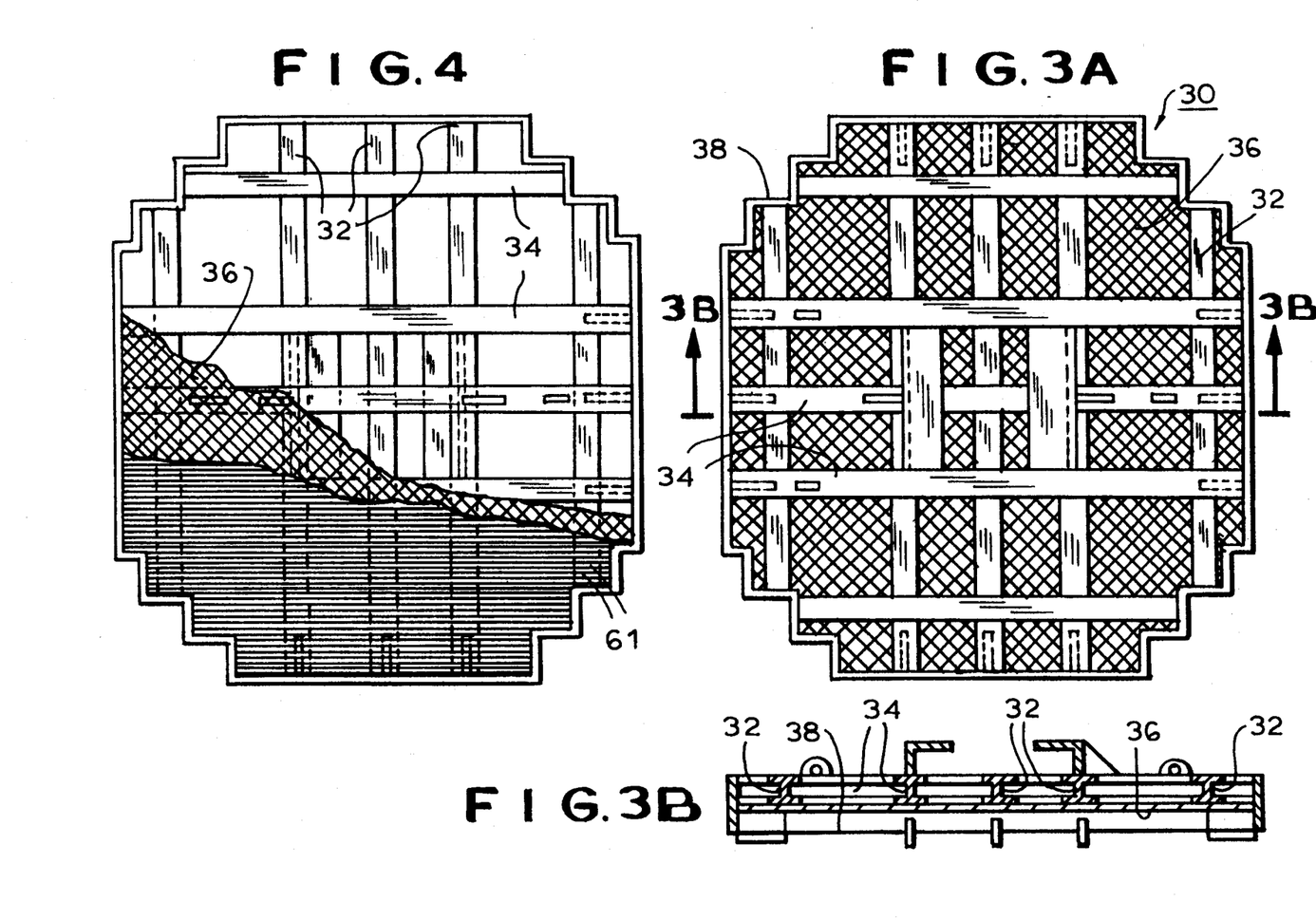
FIG. 3A is a top plan view of a support structure used to make an exemplary monolithic refractory ceramic fiber structure according to the invention.
FIG. 3B is a cross sectional view of the ceramic fiber structure of FIG. 3A taken along line 3B—3B of FIG. 3A.
FIG. 4 is a bottom plan broken away view of an exemplary monolithic refractory ceramic fiber structure according to the invention partially covered with strips of ceramic fiber layer material.

In use, the deliquefied compressed blanket can be placed onto a support, for example, an expanded metal form 30, as shown in FIG. 3A. The form may be made of a suitable metal framework, as shown in FIG. 3A, onto which an expanded metal or mesh-like material 36 is disposed.

Wet processing of the ceramic fiber blanket provides advantages over dry processing to form a highly compressed and highly dense fiber mass. In particular, the wetted ceramic fiber can be easily compressed without the use of expensive and dangerous hydraulic jacks and presses. As shown in FIG. 2, only manual rollers or other tamping or inexpensive compressing equipment is required to achieve the necessary deliquefication and compression.

Once the squeezing step has been performed and the initial compressing force has been removed, the material stays in a latent compressed state while still in the wet state, i.e. "spring back" is loaded in. In prior art systems, once the compression force is removed, the fiber spring back occurs almost immediately.

Once the ceramic fiber blanket dries, the fiber "springs back" towards its original dry thickness (depending upon chemical additives used in the aqueous solution). If properly contained by suitable structures, the dried fiber stays in a highly compressed state, with densities two or more times its original density. The ceramic fiber system according to the invention can be used to make very large high temperature resistant monolithic structures previously unattainable with conventional dry methods using jacks, presses and other compression tools.

With the present novel method, compressions of approximately 60% or greater can be obtained. For example, it has been found a 6 lb/ft$^3$ 2.25" thick ceramic fiber blanket, after water saturation, can be compressed to $\frac{7}{8}$" thick using a 2.5" short length pipe (60% compression). After drying, the samples will spring back toward their original thickness. For example, the above 6 lb/ft$^3$ 2.25" dry, $\frac{7}{8}$" thick wet blanket, after drying, springs back to $1\frac{1}{4}$", or to a 44% compressed state. If a surfactant, for example, a soap, is added to the aqueous solution, substantially complete spring back to the uncompressed state can be obtained.

Because the water or aqueous solution completely saturates the ceramic fiber system, any chemical additives provided in the aqueous solution affect the entire thickness of the ceramic fiber blanket as opposed to just the surface of the ceramic fiber blanket, an additional advantage.

Another important advantage of the invention is that wet processing of the ceramic fiber blanket allows for virtually no respirable or non-respirable fiber airborne exposure to the installer, as all the fibers are saturated in a film of water/chemicals, which keep them from becoming airborne while handling. Current dry methods must contend with airborne respirable fibers. Prewetted blanket strips can be manufactured at the factory, thereby giving the customer installer a system that provides for an airborne respirable or non-respirable fiber-free environment.

FIGS. 3A through 5B show an example of the construction of a ceramic fiber structure, e.g., a ladle cover, using the ceramic fiber according to the present invention. The ladle cover is built up on a steel support frame 30 of appropriate size comprising a plurality of vertical beams 32 and horizontal beams 34, each joined into the configuration shown. The beams 32 and 34 are completely covered with a layer of expanded metal mesh, as shown by the crosshatch lines 36. Extending around the perimeter of the frame 30 is a side wall 38. In FIG. 4, a plurality of wetted and compressed strips 61, according to the invention, of ceramic fiber material, for example, Cer-Wool, manufactured by Premier Refractories and Chemicals, Inc., are applied to the bottom or hot face of the ladle cover. The dimensions of the strips 61 are 48"×13"×2", although strips of any other dimension can be used.

Figures 6A, 6B:
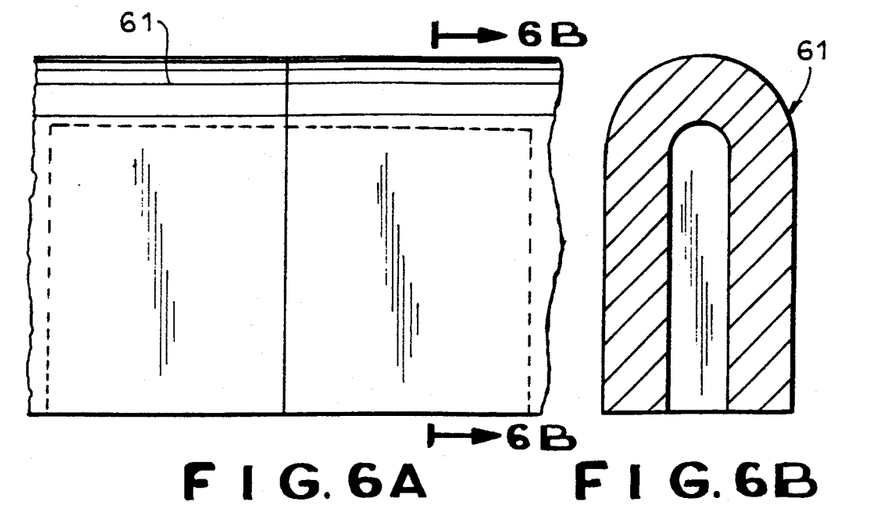
FIG. 6A shows how butt joints between longitudinal end sections of the ceramic fiber strips are made.
FIG. 6B is a cross sectional view of FIG. 6A taken along line 6B—6B of FIG. 6A.
Figure 7A:
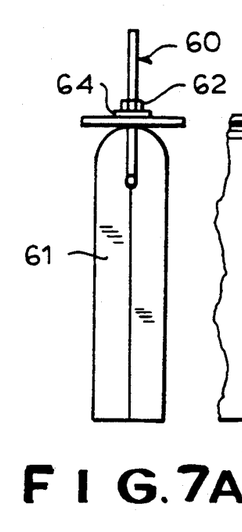
FIG. 7A is a cross sectional view through one strip of the ceramic fiber layer material of the ceramic fiber structure of FIG. 5A.
Figure 7B:
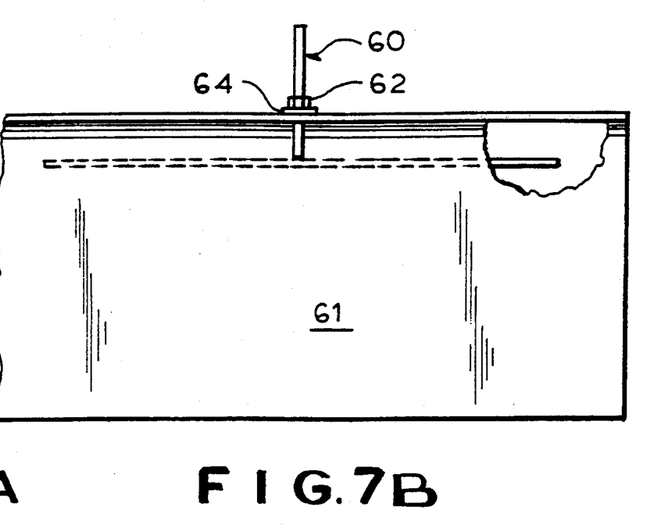
FIG. 7B is a top view, partly in cross section, of the ceramic fiber strip shown in FIG. 7A.
Figures 8A, 8B:
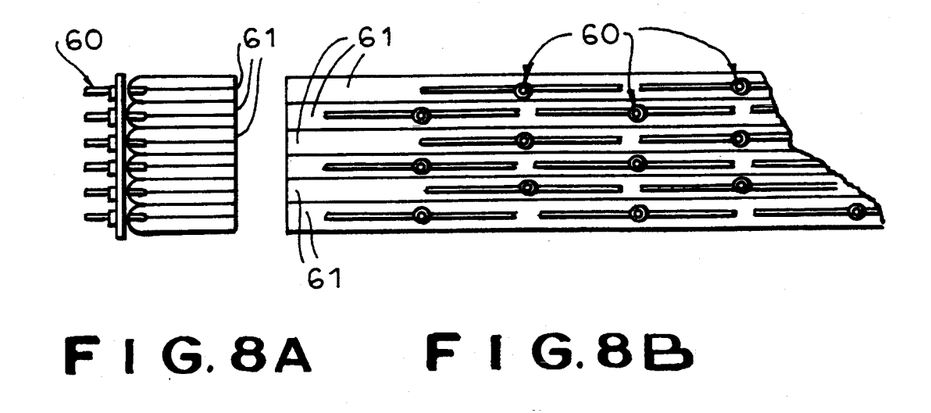
FIG. 8A shows a cross section through a plurality of the ceramic fiber strips of the ceramic fiber structure of FIG. 5A.
FIG. 8B shows a cut-away front view of the ceramic fiber strips of FIG. 8A.
Figure 9:
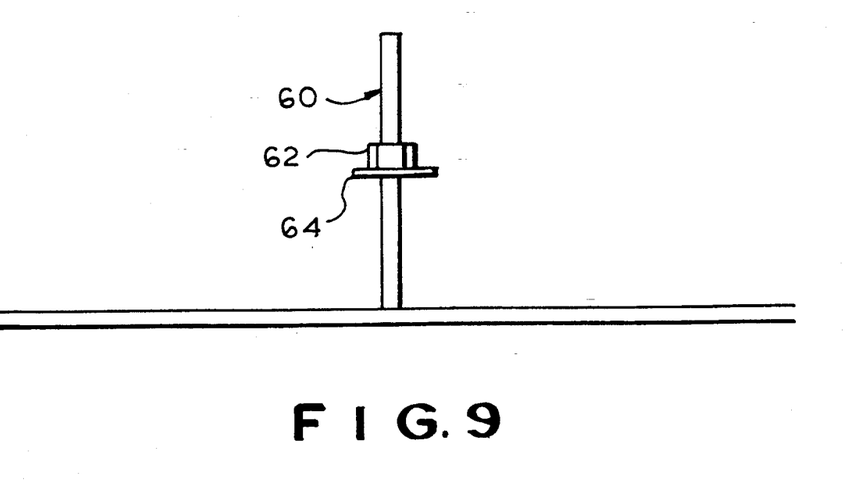
FIG. 9 shows a fastener used to hold the strips to the structure shown in FIGS. 3A, 3B, 4, 5A and 5B.

The strips 61 have been previously placed in a water tray filled with water and a small amount of a surfactant. Alternatively, as described, the ceramic fiber blankets can be sprayed with water to saturate them. A roller or other compression device, for example, a metal plate, is used to dewater and compress the fiber material from approximately a thickness of 2" down to 1". The dewatered and compressed strips 61 are placed into position on the structure, as shown in FIG. 4 and folded over to form U folds as shown in FIG. 7A. Suitable anchors inserted through the wire mesh 36, for example, T anchors 60 (FIGS. 7A, 7B and 9) are installed in the U folds on 24" to 36" centers, for example, in a diamond fashion (see FIGS. 8A, 8B), through the center part of the U-formed strips and through the wire mesh form 36 to hold the U-formed strips in place on the support. Suitable washers 64 and nuts 62 can be used on the back of the wire mesh form to secure the anchors in place. The top part of the U fold is folded over the anchor, as shown, to cover the same and protect it from heat and flames, and the next adjacent layer of the U folded blanket is then installed. Where the ends of layer section lengths meet, e.g., because not long enough to cover the entire length of the ladle cover, the U folds are butt-joint installed as shown in FIGS. 6A, 6B.

Figure 5A:
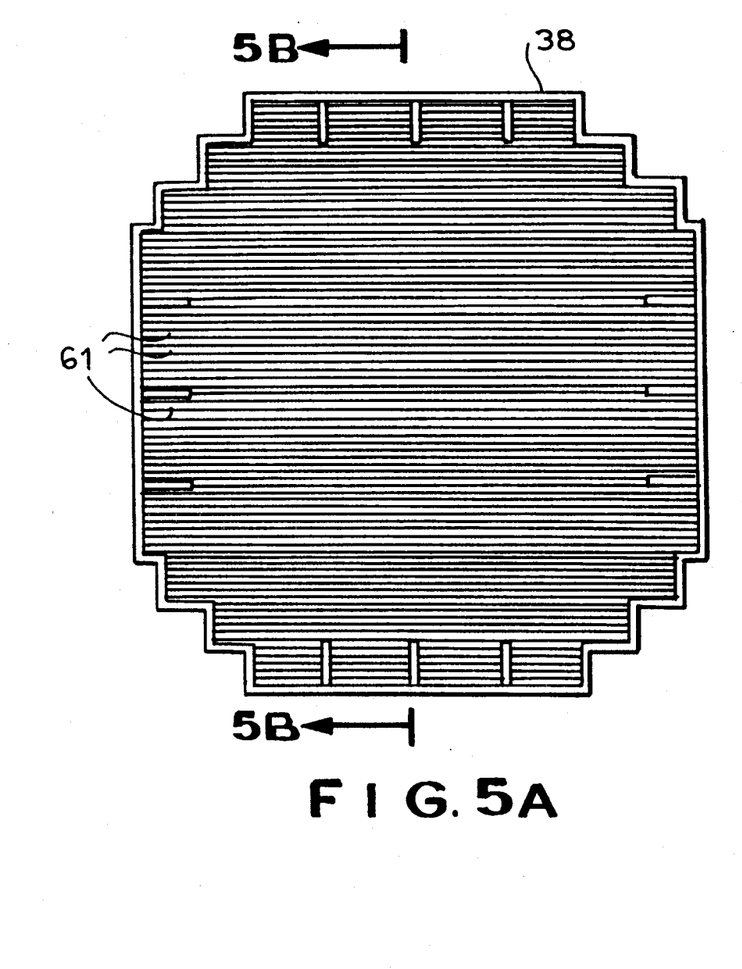
FIG. 5A is bottom plan view of the exemplary monolithic refractory ceramic fiber structure according to the invention fully covered with strips of the ceramic fiber layer material.
Figure 5B:
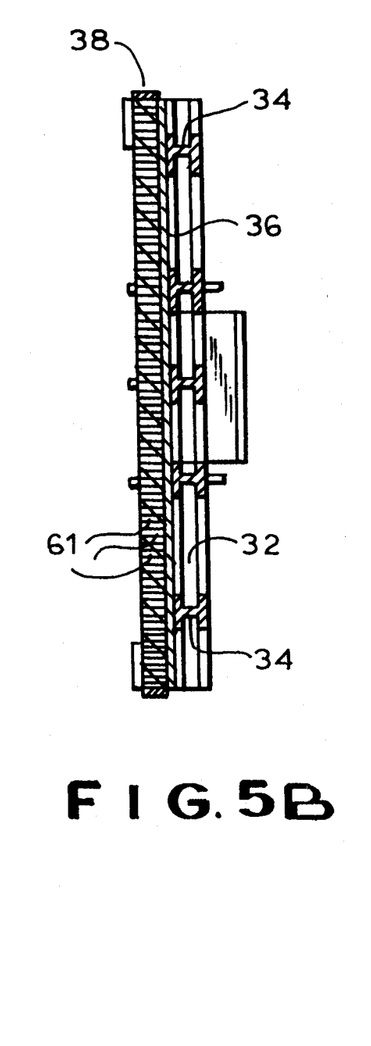
FIG. 5B is a cross sectional view of the ceramic fiber structure of FIG. 5A taken along line 5B—5B of FIG. 5A.

At the butt joints, a 6"×4"×2" compressed to 1" thick, ceramic fiber pad can be placed between and over the joint in the adjacent U folds before the top portion of the adjacent U folds are folded over the anchor. Ceramic fiber pads of other sizes can also be used. This will allow for an extra high density area around the blanket joints to reduce shrinkage and keep opening of gaps to a minimum to prevent flame leak-through. The steps of applying the U-formed strips to the metal form are repeated until the support is completely filled with the U-folded strips. FIG. 4 shows the support partially covered with U-shaped strips. After all of the ceramic fiber strips are installed, the entire area covered by the strips may be compressed again with suitable compression or tamping tools. FIG. 5A shows the bottom of the frame 30 (the hot face of the ladle cover) completely covered with U-shaped strips. The T anchors 60, and the close packing of the U folded blankets contained within the sidewall 38 of the frame 30 (FIGS. 3A through 5B), function to maintain the U folded strips in a highly compressed and highly dense state, even after the strips 61 are dried. The strips will experience some spring back as the material dries to close any gaps that exist between them, i.e., in the lining, and to compensate for shrinkage that occurs when the lining is heated at high temperatures.

It might be possible to enhance the physical and chemical properties of the ceramic fiber product by adding salts, refractory oxides, sols or sol-gels such as, but not limited to, aluminum sulfate, magnesium sulfate, colloidal alumina, silica, zirconia or combinations thereof, to the aqueous solution. The addition of those compositions might have the effect of increasing the refractoriness of the highly compressed ceramic fiber blanket at high temperatures well above 2600° F. However, it is possible that the addition of these compositions will reduce the degree of spring back.

With variations in the liquid phase of the system, there are numerous applications where the refractory installation can be used. For example, the addition of colloidal alumina, a viscosity modifying polymer and an aluminum resistant additive such as that disclosed in U.S. Pat. No. 4,806,509 can be used to enhance the properties of the wet blanket strips for use as linings for troughs and launders for molten aluminum. The enhanced strips may be applied and smoothed out manually or automatically to conform to the various components of the distribution system. Upon drying, a rigid aluminum resistant lining will exist. Such a system can also be used to form one piece linings for small kilns or for the dippers on aluminum casting machines.

The ceramic fiber blankets, according to the invention, can be furnished wet to the field, in rolls or in strips, together with anchors, to aid in installing the ceramic fiber to supports to produce monolithic fiber linings for structures such as ladle covers, etc.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method of forming a ceramic fiber product from a ceramic fiber form which has an initial dry thickness in its dry state and which tends to spring back towards the initial dry thickness after it has been wetted, compressed and subsequently dried, the method comprising the steps of:

wetting the ceramic fiber form with a non-binding aqueous solution;

compressing the ceramic fiber form while wet to make its thickness less than the initial dry thickness;

placing the ceramic fiber form in a support structure while wet, the support structure limiting the ability of the wet fiber form to expand to the dry thickness; and drying the ceramic fiber form so that it tends to expand and remain in the support structure in a compressed state.

2. The method recited in claim 1, wherein the step of compressing comprises compressing the ceramic fiber form with at least one roller.

3. The method recited in claim 1, wherein the step of compressing comprises compressing the ceramic fiber form with a tamping plate.

4. The method recited in claim 1, wherein the step of wetting comprises dipping the ceramic fiber form in a container filled with the aqueous solution.

5. The method recited in claim 1, wherein the step of wetting comprises showering the ceramic fiber form with the aqueous solution.

6. The method recited in claim 1, further comprising adding at least one of a refractory salt or refractory oxide to the aqueous solution to provide the ceramic fiber product with desired refractory properties.

7. The method recited in claim 1, further comprising the step of adding a component to the aqueous solution to facilitate the spring back.

8. The method recited in claim 7, wherein the component comprises a surfactant.

9. The method recited in claim 1, further comprising packaging the wet, compressed ceramic fiber form in a substantially air- and water-tight package after the compressing step for storage prior to use.

10. The method recited in claim 1, further comprising applying the wet, compressed ceramic fiber form to the support structure substantially immediately after the compressing step.

11. The method recited in claim 1, further comprising placing the compressed ceramic fiber form while still wet on the support structure to form a refractory ceramic fiber product.

12. The method recited in claim 11, further comprising attaching the compressed ceramic fiber form to the support structure in individual strips, thereby building up the refractory ceramic fiber product as a structure of adjacent strips.

13. The method recited in claim 12, wherein the step of attaching comprises fastening the ceramic fiber form through holes in the ceramic fiber form and apertures in the support structure.

14. The method recited in claim 13, further comprising forming the strips into a U shape having a center part and two legs extending away from the support structure, and the step of fastening comprises fastening each of the U-shaped strips through the center part to the support structure.

15. The method recited in claim 14, further comprising fastening the strips at a plurality of locations at the center part to the support structure.

16. The method recited in claim 15, further comprising butt jointing end sections of the strips together, and applying a spanning piece of the wet, compressed ceramic fiber form in the center part spanning the butt joint.

* * * * *